United States Patent [19]

Koester et al.

[11] 4,068,935
[45] Jan. 17, 1978

[54] BACKLASH FREE LENS FOCUSING APPARATUS

[75] Inventors: Richard H. Koester, Rochester; Roy E. Hickey, Honeoye Falls, both of N.Y.

[73] Assignee: The Singer Company, New York, N.Y.

[21] Appl. No.: 724,879

[22] Filed: Sept. 20, 1976

[51] Int. Cl.² .................... G02B 7/02; G03B 21/22; G03B 3/00
[52] U.S. Cl. ..................... 353/71; 350/254; 350/255; 353/101
[58] Field of Search .......... 353/71, 101; 350/255, 350/254; 352/140

[56] References Cited

U.S. PATENT DOCUMENTS

| | | | |
|---|---|---|---|
| 1,822,551 | 9/1931 | Tondreau | 353/101 |
| 3,344,706 | 10/1967 | Dian | 353/101 |
| 3,349,667 | 10/1967 | Levin et al. | 353/101 |
| 3,391,979 | 7/1968 | Lessler | 353/71 |
| 3,496,851 | 2/1970 | Himmelsbach | 350/255 |

*Primary Examiner*—Steven L. Stephan
*Attorney, Agent, or Firm*—Charles R. Lewis

[57] ABSTRACT

Apparatus for focusing a lens or lenses in which the focus adjustment is stable and in which backlash is reduced to an imperceptible level without the use of precision components. A unitary lens carrier is mounted on a shaft for axial displacement thereon and includes a first section spaced from a second section. A rotatable cam is mounted between the two sections and a spring is disposed between the cam and the second section to urge the cam against a surface portion of the first section. Rotation of the cam causes axial displacement of the lens carrier.

4 Claims, 4 Drawing Figures

BACKLASH FREE LENS FOCUSING APPARATUS

BACKGROUND OF THE INVENTION

Field of the Invention

The present invention relates to apparatus for focusing lenses wherein backlash is reduced to an imperceptible level.

Prior Art

Many projectors utilize a lens or lenses which are displaced relative to other projector structure to focus the projector image. An example of such a projector is presented in copending application Ser. No. 724,881 filed 9/20/76 and assigned to the assignee of the present invention. Included in this class of image projectors are slide and film strip projectors which project an image onto a remotely located viewing screen. Often, the focusible lens is mounted on a lens carrying structure, such as a cylindrical tube, designed for axial displacement by manual manipulation of a rotatable focus control. Mechanical coupling means are used to couple the focus control to the lens carrier structure. Such mechanical coupling means have included rack and pinion gear, lead screws, and helically grooved cams with follower.

Backlash is usually present in the mechanical coupling means and is defined as the free play that exists between the coupled elements. Backlash is measured as the distance thru which one element of a plurality of coupled elements is displaced before any movement is imparted to the other elements. Backlash can arise from the accumulation of clearances and tolerances between the elements as well as from surface wear of the elements.

In many applications backlash is acceptable and even desirable. Backlash in the focus control of an image projector, however, is considered undesirable as the projector operator is required to manually compensate for the backlash during focusing. Focus control backlash is particularly inconvenient when the projector operator must perform a series of focus control reversals of diminishing magnitude to obtain optimum image sharpness. While backlash can be reduced to an imperceptible level by the use of precision parts, the cost of such parts is not compatible with the requirements of the competitive projector market. Backlash can also be reduced through the use of spring loaded components. However, spring loading can cause the focus adjustment to "motor" or "creep" out of adjustment.

There is a need for a mechanical means to couple the focus control of a projector to the lens carrier structure in which backlash is reduced to an imperceptible level using low cost elements to allow a precise and stable lens adjustment.

SUMMARY OF THE INVENTION

A lens carrier carring one or more lenses has a first section spaced apart from a second section. The lens carrier is mounted upon a shaft having a longitudinal axis and is adapted for axial displacement along the shaft. A rotatably mounted cam is disposed in the space between the first and second section of the lens carrier. A bias means, such as a spring, is also disposed in the space between the first and second section of the lens carrier and urges the cam against a surface portion of one of the sections. Rotation of the cam causes axial displacement of the lens carrier relative the shaft.

BRIEF DESCRIPTION OF THE DRAWINGS

The present invention will be fully understood from consideration of the following detailed description taken in conjunction with the accompaning drawings, in which like reference characters refer to like parts in the several views, and wherein.

DESCRIPTION OF THE PREFERRED EMBODIMENT

Figure 1:
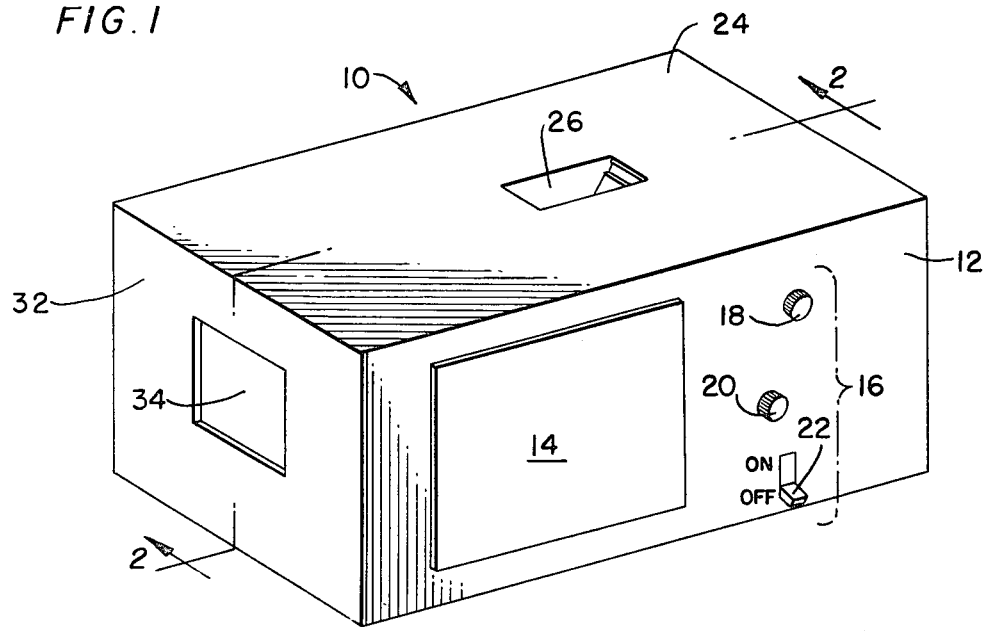
FIG. 1 is a perspective view of a filmstrip projector utilizing the present invention.

As shown in the accompaning drawings, the present invention may be incorporated into a filmstrip projector located within a housing generally designated by the reference character 10. The projector includes a front panel 12 having a viewing screen 14, designated herein as the local viewing screen, mounted thereon. Projector controls 16 are located to the right of the screen 14. The screen 14 is formed from translucent material and is the type designed to be illuminated from the interior of the projector housing 10. The controls 16 include a filmstrip advance control 18, a focus control 20, and a projector on-off switch 22. The controls 16 shown are the minimum essential for an understanding of the present invention. The projector may be combined with a power filmstrip advance means, magnetic tape audio accompaniment, and automatic filmstrip advance means actuated by cueing signals recorded on magnetic tape.

A top panel 24 includes an opening formed therein which provides access to a cavity 26 adapted to receive a filmstrip cartridge 28. The cartridge 28 has the external configuration shown in FIG. 2 and contains a coiled strip of photographic film 30. The film strip 30 includes a plurality of sequentially arranged perforations along both edges in a manner well known to those skilled in the art. The film 30 is guided along a predetermined path in the cartridge 28 to a film exit opening formed on one side of the cartridge 28. A side panel 32 of the projector housing 10 has a opening 34 formed therein to permit projecting a image onto a viewing screen (not shown) remotely located from the projector. A transparent glass plate (not shown) is mounted at the opening 34 to prevent dust or other foreign matter from entering the projector. While not illustrated, a moveable shutter is provided to cover the opening 34 when the projector is not in use for remote screen viewing to protect the transparent glass plate.

When the cartridge 28 is inserted into the cavity 26, the leading edge of the film 30 is guided into engagement with a vertically aligned film track 36. The film track 36 constitutes a guide means to maintain the film 30 in proper relationship with the other projector structure during projection. The film track 36 has an aperture 184 (FIG. 4) formed therein such that light from the projector illumination source described below passes thru the film 30 disposed in the aperture to form an image for projection.

A film 30 engaging sprocket 38 having a plurality of uniformly spaced radially extending pins 40 is located adjacent the film track 36. The sprocket 38 is secured to a shaft 42 which passes thru the front panel 12 and terminates with the film advance control 18. As the leading edge of the film 30 is guided down the film track 36, the sprocket 38 pins 40 engage the film 30 perforations. Rotation of the film advance control 18 in a first direction causes the film 30 to advance past the aperture toward the lower end of the film track 36. Rotation of the film advance control 18 in a second direction causes the film 30 to retract into the cartridge 28. The lower end of the film track 36 communicates with a chamber 44 which accumulates the film 30 as it is advanced.

The projector illumination source is a lamp 46 mounted in a socket or holder 50 secured to both the projector side and the base 48. The holder 50 has a opening 52 formed therein. A mirror 54 is mounted above the opening 52 to reflect a portion of the light from the lamp 46 along an image axis 56 thru the aperture formed in the film track 36 and the optical elements of the projector described below. Electrical power is provided to the lamp 46 by means of an electrical circuit (not shown) in cooperation with on-off switch 22.

Figure 2:
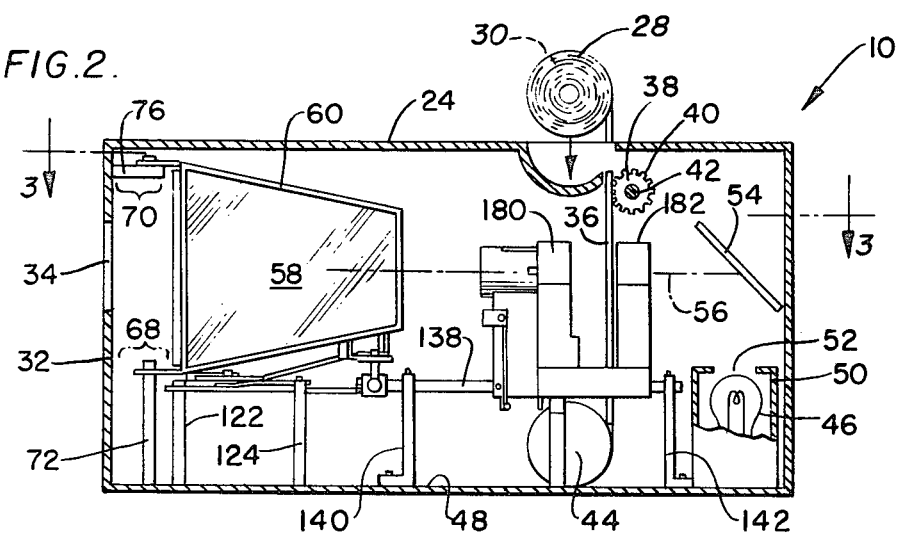
FIG. 2 is a front elevation cross section view of the projector shown in FIG. 1 taken along line 2—2.
Figure 3:
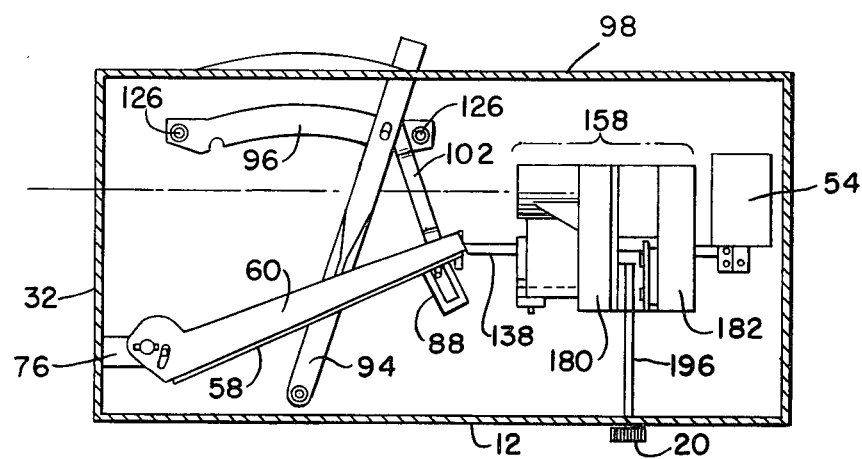
FIG. 3 is a top cross section view of the projector shown in FIG. 1 and FIG. 2 taken along line 3—3.
Figure 4:
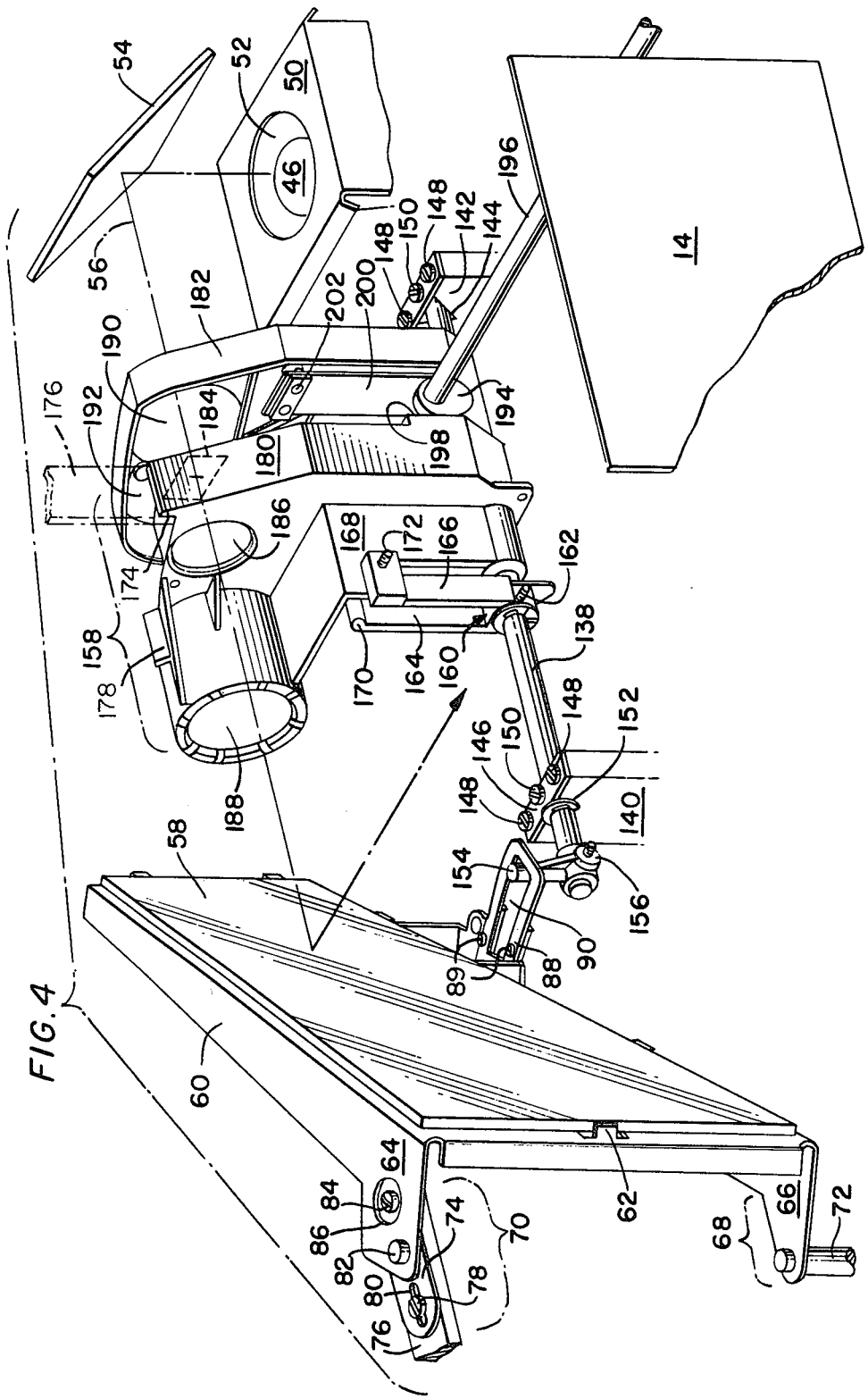
FIG. 4 is a partial perspective view of the projector elements shown in FIG. 2 and FIG. 3 with selected structure omitted or shown in simplified form for reasons of clarity.

Referring now to FIG. 4 for further details of the present invention shown in FIG. 2 and FIG. 3, a mirror 58 is adhesively secured to a mirror support frame 60. Tabs 62, which extend outward from the frame 60, serve to positionally locate the mirror on the frame 60. One edge of the frame 60 has an upper extension 64 and a lower extension 66 which extend laterally outward to support the frame 60 on lower pivot 68 and an adjustable upper pivot 70. The lower pivot 68 includes a vertically aligned support shaft 72 secured to and extending upwardly from the base 48. The upper end of the support shaft 72 has a reduced diameter portion which extends thru a clearance hole formed in the lower extension 66 to allow relative rotation between the frame 60 and the support shaft 72. The adjustable upper pivot 70 includes a bearing plate 74 fastened to a support bracket 76 by means of a threaded fastner 78 passing thru a slot 80 formed in the bearing plate 74. The bearing plate 74 includes a stub shaft 82 passing thru a clearance hole in the upper frame extension 64 to allow relative rotation between the stub shaft 82 and the frame 60. A second threaded fastener 84 passes thru a clearance hole 86 formed in the upper extension 64 and thru a clearance hole (not shown) formed in the bearing plate 74. The mirror 58 can be adjusted relative the other projector parts described below by varying the position of the threaded fastener 78 in the slot 80 and the position of the threaded fastener 84 in its clearance hole (not shown).

The mirror support frame 60 can rotate about a substantially vertical axis defined by the lower pivot 68 and the upper pivot 70 between a first position and a second position. The position of the mirror support frame 60 shown in FIG. 4 is designated the first mirror 58 position. In the first position the mirror 58 is rotated counterclockwise (when viewed from above as shown in FIG. 3) toward the rear of the projector. The mirror 58 will intercept any images transmitted along the image axis 56 and reflect the images in a second direction to the viewing screen 14. The position of the mirror support frame 60 shown in FIG. 3 is designated the second mirror 58 position. In the second position the mirror 58 rotated clockwise (when viewed from above) toward the front of the projector.

The mirror 58 is rotated out of the image axis 56 and any images transmitted along the image axis will pass through opening 34 to the remotely located viewing screen (not shown).

The mirror support frame 60 is moved between its first position and its second position by means of a lever 94 shown in plan view in FIG. 3. The lever 94 is pivoted for relative rotation about one end. The distal end of the lever 94, which extends through a slot (not shown) in the rear wall 98, is free to sweep across a horizontally disposed guide plate 96. A link 102 connects the lever 94 with the mirror support frame 60. One end of the link 102 is pivotally connected to the lever 94 and the other end of the link 102 is pivotally connected to the mirror support frame 60. Actuation of the lever 94 to the right (as in FIG. 3) causes the link 102 to move the mirror support frame 60 the second mirror position, and actuation of the lever to the left causes the link 102 to move the mirror support frame 60 the first mirror position.

The torque required to rotate the mirror support frame 60 between its first position and its second position arises from friction generated by the upper pivot 70 and the lower pivot 68. The torque is substantially the same for mirror support frame 60 rotation in either direction.

A lost motion link 88 extends arcuately outward from the lower edge of the mirror support frame 60 and includes an arcuate slot 90 formed therein. The link 88 couples the mirror support frame 60 with other parts of the projector described below. The link 88 is secured to the lower edge of the mirror support frame 60 by a plurality of threaded fasteners 89, each of which passes thru clearance slots (not shown) to engage threaded holes in the mirror support frame 60. The position of the link 88 relative to the other projector structure may be varied by adjusting the position of the threaded fasteners 89 in their respective slots.

A lens carrier shaft 138 shown in FIG. 4 is mounted for rotation upon supports 140 and 142 which are secured to the base 48. A "V" notch (shown in support 142 only) is formed in the top of each support 140 and 142 to receive the shaft 138. A retainer strap 146, fastened to each support by threaded fasteners 148, spans each notch 144 to restrain the shaft 138 in the notch 144. An adjustment screw 150 passes thru a threaded hole in the strap 146 to provide an adjustable means to limit the radial movement of the shaft 138. To prevent marring of the surface of the shaft 138, the adjustment screw 150 may be tipped with nylon or other suitable plastic. Axial translation of the shaft 138 is prevented by circumferential "C" Clips 152 disposed in peripheral grooves (not shown) located adjacent the outer sides of the supports 140 and 142.

The end of the shaft 138 nearest the mirror support frame 60 has a radially extending arm 154 secured by set screw 156 to the shaft 138 for rotation therewith. The arm 154 may be secured to the shaft by other suitable means including a roll pin. The distal portion of the arm 154 extends thru the slot 90 in the lost motion link 88 described above. The arm 154 in combination with the link 88 constitutes a coupling means between the mirror 88 and the shaft 138.

Rotation of the mirror support frame 60 to the second mirror 58 position causes the shaft 138 to rotate to a second shaft position. As the mirror support frame 60 begins rotating toward the second mirror 58 position, the arm 154 and the shaft 138 remain stationary. As the mirror support frame 60 nears the second mirror 58 position the other end of the link 88 engages the distal portion of the arm 154 to cause the shaft 138 to rotate to the second shaft position.

A unitary lens carrier, generally designated by the reference character 158, is mounted on the shaft 138. The lens carrier 158 may be formed from any suitable material, such as a rigid plastic. The shaft 138 extends thru a clearance bore in the lens carrier 158 such that the lens carrier 158 is free to rotate relative to the shaft 138 and translate axially along the shaft 138.

A fork element 160 causes the lens carrier 158 to rotate with the shaft 138. The fork 160 element is secured to the shaft 138 by a set screw 162 for rotation therewith and is bifurcated to form two parallel spaced apart tines 164 and 166. The fork 160 element may be secured to the shaft by other suitable means including a roll pin. Each tine embraces a side of a depending web 168 integrally formed with the lens carrier 158. A contacting pad 170 is formed at the distal end of the tine 164, and an adjusting screw 172 extends thru a threaded hole near the distal end of the tine 166.

When the mirror support frame 60 is rotated to its first position shown in FIG. 4 the shaft 138 is caused to rotate to the first shaft 138 position thereby causing the fork 160 secured to the shaft 138 to rotate. The adjusting screw 172 passing thru tine 166 contacts the web 168 and causes the lens carrier 158 to rotate to a first lens carrier 158 position as shown in FIG. 4. A lens carrier stop 176 (shown in phantom in FIG. 4) is utilized to arrest the motion of the lens carrier 158 at the first lens carrier position. The stop 176 is secured to and depends from projector structure (not shown) and co-operates with an abutment 174 integrally formed with the lens carrier 158 to establish the first lens carrier position.

When the mirror support frame 60 is rotated to its second position as shown in FIG. 3 the shaft 138 is caused to rotate to the second shaft 138 position thereby causing the fork 160 secured to the shaft 138 to rotate. The pad 170 at the distal end of tine 164 contacts the lens carrier 158 web 168 and causes the lens carrier 158 to rotate toward a second lens carrier 158 position as shown in FIG. 3. The lens carrier stop 176 cooperates with another abutment 178, also integrally formed with the lens carrier 158, to establish the second position of the lens carrier 158. The lens carrier 158 to stop 176 relationship may be adjusted by varying the position of the lost motion link 88 securing screws 89. The torque required to rotate the lens carrier 158 arises from the shaft 138 bearing friction and the amount created by the mass of the lens carrier 138. The torque is substantially the same for lens carrier 138 rotation in either direction.

The unitary lens carrier 158 includes an objective lens mount 180 and a condensing lens mount 182 spaced apart from the objective lens mount 180. The film track 36, described above, is disposed in the space between the objective lens mount 180 and the condensing lens mount 182. The film track 36 is not shown in FIG. 4 for reasons of clarity. The position of the aperture is represented by dashed line 184. A first objective lens 186 and a second objective lens 188 are located in the objective lens mount 180 in a angularly spaced relation. The first objective lens 186 and the second objective lens 188 are located in different spaced planes to properly focus the image at the required distances. A first condensing lens 190 and a second condensing lens 192 are located in the condensing lens mount 182 in an angularly spaced relation. The first condensing lens 190 is specifically adapted to provide optimum illumination efficiency when combined with the first objective lens 186. Likewise, the second condensing lens 192 is specifically adapted to provide optimum illumination efficiency when combined with the second objective lens 188. The first objective lens 186 and the first condensing lens 190 are so mounted in the lens carrier 158 that the optical axes of these two lenses are coincident. Likewise, the second objective lens 188 and the second condensing lens 192 are so mounted in the lens carrier 158 that the optical axes (not shown) of these two lenses are coincident. The first set of lenses, 186 and 190, is specifically adapted for local screen 14 projection. The second set of lenses, 188 and 192, is specifically adapted for remote screen viewing. By utilizing separate condensing lenses specifically adapted for remote or local screen viewing and mounting these condensing lenses on the same focusable lens carrier as the objective lenses, it is possible to optimize projection efficiency.

Placing the mirror support frame 60 in the first mirror 58 position by means of the lever 94 causes the link 88 and the arm 154 to rotate the shaft 138 to the first shaft 138 position to place the mirror 58, the first objective lens 186, and the first condensing 190 in the projector image axis 56. Light from the projector lamp 46 is reflected by the mirror 54 along the image axis 56 thru the first condensing lens 190, thru the film 30 located in the aperture 184, and thru the first objective lens 186. The image falling on mirror 58 is reflected in a second direction to the local viewing screen 14.

Placing the mirror support frame 60 in the second mirror 58 position by means of the lever 94 causes the link 88 and the arm 154 to rotate the shaft 138 to the second shaft 138 position to place the mirror 58 out of the image axis 56, and the second objective lens 188 and the second condensing lens 192 in the projector image axis 56. Light from the projector lamp 46 is reflected by the mirror 54 thru the second condensing lens 192, the film 30 located in the aperture 184, thru the second objective lens 188, and thru the projection opening 34 onto a remotely located viewing screen (not shown).

The focus adjustment is accomplished by means of a circular cam 194 lobe disposed in the space in between the objective lens mount 180 and the condensing lens mount 182. One end of a focus shaft 196 is secured to a side of the cam 194 at a location other than the geometric center such that the cam 194 may rotate in an eccentric manner. The focus shaft 196 is rotatably mounted in and supported by suitable bearings (not shown). The shaft 196 extends from the cam 194 thru the front panel 12 and terminates with the focus control 20. Rotation of the focus control 20 will cause rotation of the cam 194. One end of the leaf spring 200 is secured to the condensing lens mount 182 by threaded fastners 202. Other fastening means, such as ultra sonic staking, may be utilized to secure the leaf spring 200 to the lens mount 182. The distal end of the spring 200 bears against the cam 194. The leaf spring 200 is so located that a bending moment is established in the spring 200 when the cam 194 is installed. This bending moment forces the distal end of the leaf spring 200 against the cam 194 and concurrently develops a reaction force transmitted through the lens carrier 158 which continuously urges the surface 198 against the cam 194. The width of the spring 200, as well as the surface 198, is such that the focus adjustment can occur when the lens carrier 158 is at its first position or at its second position. Rotation of the focus control 20 causes the curve-linear surface of the cam 194 to axially displace the lens carrier 158 along the shaft 138.

The positioning of the cam 194, the leaf spring 200, and the cam following surface 198 is such that the focus adjustment is stable. Since the lens carrier 158 is free to move axially along the shaft 138, the force at the distal end of the leaf spring 200 and the cam 194 is balanced by the reaction force at the surface 198 and the other side of the cam 194. There is little tendency for the focus adjustment to "motor" or "creep" out of focus. In some spring loaded cam arrangements the forces presented at the curved surface of an eccentrically mounted cam by the spring biasing means can cause a resultant torque which will cause the cam to "motor"or "creep" from the desired setting. In the preferred embodiment this problem is overcome. The cam following surface 198 is always tangential to the cam 194 and the distal end of the leaf spring 200 substantially tangential to the cam 194 for the range of focus adjustment. The line of the leaf spring 200 force is substantially thru the geometric center of the cam and is substantially coincident with the line of the reaction force of the cam following surface 198. Little, if any, resultant torque is generate which could cause the focus adjustment to "motor" or "creep" out of adjustment.

The focus adjustment can be accomplished without the perceptible presence of backlash. The distal end of the leaf spring 200 causes the surface 198 to be continuously urged against the cam 194 to thereby compensate for any dimensional change of the parts. Such dimensional change may arise from thermal expansion or contraction, and surface wear. Minute changes in focus, including a series of focus control 20 reversals of diminishing magnitude can be made by the operator without having to manually compensate for backlash.

The only sources of backlash in the focusing system are the clearances between the focus shaft 196 and its support bearings. The clearance between the focus shaft 196 and its bearings can be reduced to an imperceptible level with inexpensive dimensionally standarized bearings and shafts.

As will be apparent to those skilled in the art, various changes and modifications may be made to the preferred embodiment described without departing from the scope of the present invention as defined by the appended claims.

We claim:

1. A lens focusing apparatus comprising:
   a lens carrier having a first section spaced apart from a second section;
   said lens carrier including a first objective lens in alignment with a first condensing lens; and
   a second objective lens in alignment with a second condensing lens.
   said first objective lens and said second objective lens carried in said first section; and
   said first condensing lens and said second condensing lens carried in said second section.
   said lens carrier mounted on a shaft and adapted for axial displacement along said shaft;
   a rotatably mounted cam disposed between said first section and said second section; and
   a force biasing means disposed between said cam and said second section to urge a surface portion of said first section against said cam;
   whereby rotation of said cam causes axial displacement of said lens carrier relative to said shaft.

2. The apparatus cited in claim 1 wherein,
   said force bias means is a leaf spring having a bending moment established therein.

3. The apparatus recited in claim 1 wherein,
   said lens carrier includes a bore there thru and said shaft extends thru said bore.

4. The apparatus according to claim 1 wherein
   said cam includes a radial cam having a peripheral cam surface.

* * * * *